Jan. 11, 1966 D. C. SHARP 3,228,128

TAMPER INDICATING DEVICE

Filed Jan. 31, 1964

INVENTOR.
Donald C. Sharp
BY Nicholas A. Camasto
ATTY.

United States Patent Office 3,228,128
Patented Jan. 11, 1966

3,228,128

TAMPER INDICATING DEVICE

Donald C. Sharp, Elmhurst, Ill., assignor to Admiral Corporation, Chicago, Ill., a corporation of Delaware Filed Jan. 31, 1964, Ser. No. 341,619
4 Claims. (Cl. 40—2.2)

This invention relates to identification devices such as for displaying the serial number or the like of an object.

The object of the invention is to provide a simple and inexpensive identification device which is attached to the structure and which readily displays an identifying symbol, and which has further and normally concealed means for identification so that should the visible portion be removed or altered, the normally concealed means for identification remains, affording relatively permanent means for identification.

It is a further object to provide a simple and inexpensive identification device of the type described which readily allows detection of the fact that the identification device has been tampered with.

For purposes of illustration, and not of limitation, the invention is shown on the accompanying drawing, in which.

In each of the figures of the drawing, similar reference characters designate similar parts in the different views.

Figure 1:
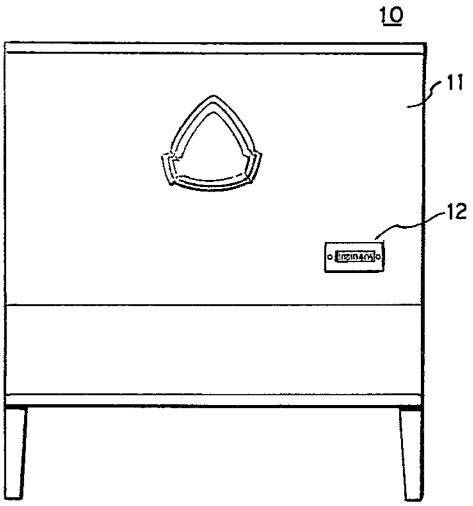
FIG. 1 is a simplified rear view of a television receiver having an identification device which is made in accordance with the invention attached thereto.
Figure 2:
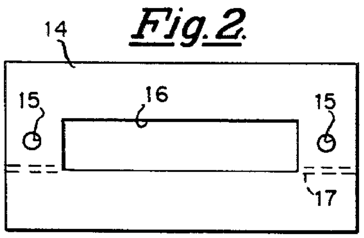
FIGS. 2 and 3 are the front and right end views, respectively of the face plate of the identification device.
Figure 3:
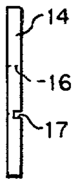
Figure 4:
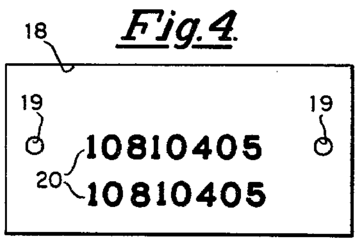
FIG. 4 is a front view of the card or the like of the identification device.
Figure 5:
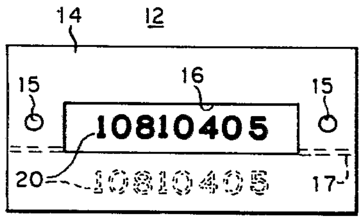
FIG. 5 is a front view of the identification device when it is assembled.

In FIG. 1, an identification device 12 is shown attached to rear panel 11 of a television receiver 10. In accordance with one embodiment of the invention, identification device 12 is a two-piece device comprising a plate 14 and a card or the like 18. Plate 14 has two mounting holes 15 and a slot 16 formed therein. A groove 17, which is best seen in FIG. 3, is formed in the back of plate 14, for reasons to be explained. Card 18 has two identical identifying symbols, in this particular case two identical serial numbers are shown, printed thereon. These serial numbers are located on card 18 so that when plate 14 and card 18 are assembled as shown in FIG. 5, one of the serial numbers is visible through the slot 16 in plate 14 and the other serial number is normally concealed, being hidden by the lower portion of plate 14. Mounting holes 19 in card 18 serve both to mount card 18 and to align card 18 with respect to plate 14 so that the serial numbers are properly located.

Identification device 12, after being assembled as shown in FIG. 5, is attached to the rear panel 11 of television receiver 10 by means of rivets or the like passed through mounting holes 15 and 19 in plate 14 and card 18, respectively. If a nut and bolt are used, the ends of the bolts are preferably upset to prevent easy removal of the nuts. Television receiver 10 is easily identified by means of the serial number which is visible through the slot 16 in plate 14. Even though the visible serial number is removed or altered, the original serial number is still present under the lower portion of plate 14. Hence a relatively permanent means of identification is provided.

The normally concealed serial number is extremely valuable in case of theft when, at a later time, it may be necessary to identify the television receiver and the normally visible serial number has been removed or altered. In such a case, the lower portion of plate 14 may be removed, in the manner described below, and the original serial number is available for inspection. Plate 14, for this reason, is preferable fabricated from a strong durable, but still breakable, material such as a heavy gauge sheet metal or a plastic material. Groove 17 formed therein weakens plate 14 at the location of the groove and plate 14 will therefore break at groove 17 when plate 14 is bent outward. Access to the concealed serial number may therefore be gained by placing a screw driver or the like under the dege of plate 14 and bending it outward.

Furthermore, in cases where both serial numbers have been removed or altered, it is helpful and desirable that this fact be obvious to those checking the serial numbers. With this particular identification device, the only way both serial numbers could be removed or altered, without removing the device from the television receiver, is by bending the lower portion of plate 14 to gain access to the normally concealed serial number. The lower portion of plate 14 will break off in such a case, as described above, and it will therefore be obvious that someone has tampered with identification device 12.

Figure 6:
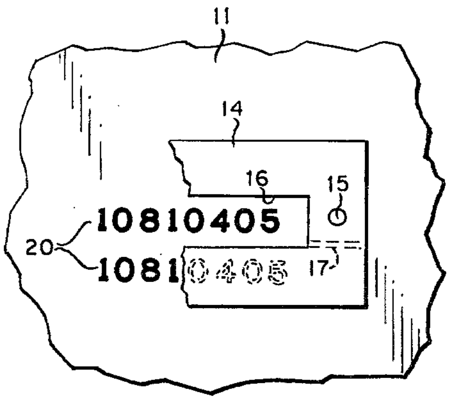
FIG. 6 shows a fragmentary section of the rear panel of the television receiver shown in FIG. 1 and a partial view of the face plate of the identification device as it may be used in an alternative manner.

In FIG. 6 there is shown an alternate method of using identification device 12. In cases where the identifying symbol may be readily printed or stamped on the structure itself card 18 may be eliminated. In FIG. 1, 11 represents a fragmentary section of the rear panel 11 of television receiver 10 upon which the serial numbers are printed or stamped. As in the previously described embodiment, one of the serial numbers is located so that it is visible through the slot 16 in plate 14 and the other is located so that it is normally concealed by the lower portion of plate 14 when plate 14 is attached to rear panel 11. The same previously described advantages are provided by this arrangement.

What has been described above is a very simple and inexpensive identification device which provides a relatively permanent means of identifying objects and which readily allows detection of the fact that the identification device has been tampered with. Certain modifications will be obvious to those skilled in the art and the invention therefore is to be limited only as it is defined in the appended claims.

The embodiments of the invention in which an exclusive property or privilege is claimed are defined as follows:

1. In combination with means having at least two identifying marks thereon, identification means consisting of a breakable plate-like member having an aperture therein, one of said identifying marks being visible through said aperture and the other one of said identifying marks being hidden from view by said plate-like member, a scoring formed in one side of said plate-like member, whereby said plate-like member when secured to said means will break along said scoring in the event said plate-like member is deformed to obtain access to said hidden identifying mark.

2. In combination with means to be identified, identification means comprising a breakable plate-like member having an aperture therein, means having at least two identifying marks thereon, said last-mentioned means being positioned with respect to said plate-like member such that one of said identifying marks is visible through said aperture and the other one of said identifying marks is hidden from view by said plate-like member, a slot formed in one side of said plate-like member, whereby said identification means when secured to said means to be identified serves to identify said last-mentioned means and said plate-like member will break along said slot in the event said plate-like member is deformed to obtain access to said hidden identifying mark.

3. Identification means comprising means having at least two identifying marks thereon and a plate-like member having an aperture therein, said plate-like member being positioned with respect to said first-mentioned means such that one of said identifying marks thereon is visible through said aperture and the other one of said identifying marks is normally concealed by said plate-like member, said plate-like member having a scoring formed in one side thereof to allow said plate-like member to be broken along said scoring to gain access to said concealed identifying mark, thereby providing an additional identifying mark in the event said visible identifying mark is removed or altered.

4. In combination with means having at least two identifying marks thereon, identification means comprising a plate-like member having an aperture therein, said plate-like member being attached to said means to be identified in a fashion such that one of said identifying marks is visible through said aperture to thereby provide a ready means for identifying the same and the other one of said identifying mark is concealed by a portion of said plate-like member to thereby provide an identifying mark which may be used to identify said means in the event said visible identifying mark is removed or altered, said plate-like member being scored on one side thereof to allow said plate-like member to be broken along said scoring, whereby access may be easily gained to said concealed identifying mark.

References Cited by the Examiner

UNITED STATES PATENTS

| | | | |
|---|---|---|---|
| 51,782 | 12/1885 | Bowlsby | 40—2 |
| 383,854 | 6/1888 | Best | 283—9 |
| 2,023,829 | 12/1935 | Wright | 283—6 |
| 2,395,804 | 3/1946 | De Gruchy | 283—6 |

EUGENE R. CAPOZIO, *Primary Examiner.*

WENCESLAO J. CONTRERAS, *Assistant Examiner.*